(12) United States Patent
Bellini et al.

(10) Patent No.: US 12,361,780 B2
(45) Date of Patent: Jul. 15, 2025

(54) COMPUTER-IMPLEMENTED METHOD FOR COPY PROTECTION, DATA PROCESSING DEVICE AND COMPUTER PROGRAM PRODUCT

(71) Applicant: European Central Bank, Frankfurt am Main (DE)

(72) Inventors: Claudio Bellini, Rome (IT); Martin Eichenberger, Zollikon (CH); Elisabeth Schulz, Frankfurt (DE)

(73) Assignee: European Central Bank, Frankfurt (DE)

( * ) Notice: Subject to any disclaimer, the term of this patent is extended or adjusted under 35 U.S.C. 154(b) by 404 days.

(21) Appl. No.: 17/779,107

(22) PCT Filed: Nov. 24, 2020

(86) PCT No.: PCT/EP2020/083208
§ 371 (c)(1),
(2) Date: May 23, 2022

(87) PCT Pub. No.: WO2021/105121
PCT Pub. Date: Jun. 3, 2021

(65) Prior Publication Data
US 2022/0415111 A1    Dec. 29, 2022

(30) Foreign Application Priority Data
Nov. 26, 2019   (EP) ..................................... 19211566

(51) Int. Cl.
*G07D 7/202* (2016.01)
*G06F 21/60* (2013.01)
(Continued)

(52) U.S. Cl.
CPC ............ *G07D 7/202* (2017.05); *G06F 21/602* (2013.01); *G06V 10/70* (2022.01); *G06V 20/95* (2022.01);
(Continued)

(58) Field of Classification Search
CPC ..... H04L 2209/56; H04L 63/10; H04L 67/34; G06N 20/00; G06N 3/0464; G06N 3/08;
(Continued)

(56) References Cited

U.S. PATENT DOCUMENTS

| 5,483,602 A | 1/1996 | Stenzel et al. |
| 5,956,408 A * | 9/1999 | Arnold ................... H04L 9/302 713/1 |

(Continued)

FOREIGN PATENT DOCUMENTS

| EP | 2 165 314 A1 | 3/2010 |
| JP | 06-268859 A | 9/1994 |

(Continued)

OTHER PUBLICATIONS

Ren, Yueqiu. Banknote recognition in real time using ANN. Diss. Auckland University of Technology, 2017 (Year: 2017).*
(Continued)

*Primary Examiner* — Aaron W Carter
*Assistant Examiner* — Courtney Joan Nelson
(74) *Attorney, Agent, or Firm* — Gavrilovich, Dodd & Lindsey LLP (57) ABSTRACT

A computer-implemented method for preventing unauthorized processing of a digital representation of at least a portion of a document, a device for data processing, and a computer program product are provided, wherein in particular the document is a banknote. The method comprises providing data, wherein the data is based on the digital representation of at least a portion of a test element. The (Continued)

digital representation may be an image file corresponding to the at least one portion of the test element. The method also involves analyzing the data with regard to data representing at least one characterizing feature of the at least one portion of the document. The method further comprises activating prohibiting means if the data being based on the digital representation of the at least one portion of the test element is similar to the data representing the at least one characterizing feature. The prohibiting means prohibit the data being based on the digital representation of the at least one portion of the test element to be further processed, in particular comprising copying and/or transmitting and/or printing and/or reproducing the data. Alternatively, the prohibiting means amend the data such that the data is prevented from being transmitted and/or printed and/or reproduced and/or further amended by data processing devices.

18 Claims, 3 Drawing Sheets

(51) Int. Cl.
| | | |
|---|---|---|
| *G06V 10/70* | (2022.01) | |
| *G06V 20/00* | (2022.01) | |
| *G06V 30/418* | (2022.01) | |
| *G07D 7/12* | (2016.01) | |

(52) U.S. Cl.
CPC ............ *G06V 30/418* (2022.01); *G07D 7/12* (2013.01); *G07D 2207/00* (2013.01)

(58) Field of Classification Search
CPC .... G06N 3/045; G06N 3/063; G06F 21/6245; G06F 21/44; G06F 21/602; G06F 18/22; G06F 21/121; G06V 20/95; G06V 30/418; G06V 10/764; G06V 10/82; G06V 30/19147; G06V 10/70; G06V 30/19173; G06V 30/413; G06V 30/42; G06V 10/22; G06V 10/761; G06V 10/245; G06V 10/771; G06V 40/1365; H04N 1/00843; H04N 1/00875; G07D 2207/00; G07D 7/12; G07D 7/202

See application file for complete search history.

(56) References Cited

U.S. PATENT DOCUMENTS

| | | | |
|---|---|---|---|
| 6,839,146 B1 | 1/2005 | Ishida et al. | |
| 7,639,858 B2* | 12/2009 | Ross | G07D 7/12 |
| | | | 382/209 |
| 8,086,017 B2* | 12/2011 | He | G07D 7/206 |
| | | | 382/209 |
| 8,464,875 B2* | 6/2013 | Blair | G07D 7/06 |
| | | | 209/534 |
| 10,127,447 B2* | 11/2018 | Duerksen | G07D 7/20 |
| 2002/0136426 A1 | 9/2002 | Davis et al. | |
| 2007/0154079 A1 | 7/2007 | He et al. | |
| 2019/0251349 A1* | 8/2019 | Duerksen | G07D 7/00 |

FOREIGN PATENT DOCUMENTS

| | | |
|---|---|---|
| JP | 11-96431 A | 4/1999 |
| JP | 2000-287081 A | 10/2000 |
| JP | 2002-359740 A | 12/2002 |
| JP | 2005-157732 A | 6/2005 |
| JP | 2006-338548 A | 12/2006 |
| JP | 2010-503099 A | 1/2010 |
| JP | 2019-008624 A | 1/2019 |
| WO | 2008/029340 A2 | 3/2008 |

OTHER PUBLICATIONS

Han, Miseon et al., "Joint Banknote Recognition and Counterfeit Detection Using Explainable Artificial Intelligence", Sensors, vol. 19, No. 16, pp. 3607 (18 pages), Aug. 19, 2019.
Lee, Ji et al., "A Survey on Banknote Recognition Methods by Various Sensors", Sensors, vol. 17, No. 2, pp. 313 (45 pages), Feb. 8, 2017.
Pham, Tuyen Danh et al., "Deep Learning-Based Multinational Banknote Type and Fitness Classification with the Combined Images by Visible-Light Reflection and Infrared-Light Transmission Image Sensors", Sensors, vol. 19, No. 4, pp. 792 (28 pages), Feb. 1, 2019.
Ren, Yueqiu, "Banknotes Recognition in Real Time Using ANN", School of Engineering, Computer and Mathematical Sciences, Nov. 3, 2017, 110 pages.
Stoffers, Christian, International Search Report and Written Opinion, International Searching Authority, European Patent Application, PCT/EP2020/083208, Feb. 4, 2021.
Extended European Search Report, European Patent Office, EP19211566.5, May 15, 2020.
International Preliminary Report on Patentability, The International Bureau of Wipo, PCT/EP2020/083208, Jun. 9, 2022.
Yamada, Tatsumi, Office Action, Application No. 2022-556703, Japan Patent Office, Oct. 1, 2024.

\* cited by examiner

COMPUTER-IMPLEMENTED METHOD FOR COPY PROTECTION, DATA PROCESSING DEVICE AND COMPUTER PROGRAM PRODUCT

CROSS REFERENCE TO RELATED APPLICATIONS

This application is a U.S. National Phase Application filed under 35 U.S.C. § 371 and claims priority to International Application No. PCT/EP2020/083208, filed Nov. 24, 2020, which application claims priority to European Application No. 19211566.5, filed Nov. 26, 2019, the disclosures of which are incorporated herein by reference.

FIELD

The invention relates to a computer-implemented method for copy protection, a data processing device, and a computer program product.

BACKGROUND

Security-relevant documents such as flight tickets or banknotes are often subject to counterfeiting actions. One measure to approach forged documents relates to the assessment of the authenticity of questionable documents. However, this approach is a downstream activity in the sense that the original document has been reproduced already at the time of performing the authentication process on the questionable document. Therefore, authentication-related measures are less desirable.

The reproduction of the original document itself can be performed by means of scanning devices, printers and/or copying devices. In this regard, a different approach relates to a method according to which a security-related document is recognized and its reproduction is prohibited before even being performed.

Various security features exist for the purpose of preventing the actions described above. They may be for example printed graphical design elements that are recognized by special detectors in the aforesaid devices. The detectors may then trigger a response, which interferes with the desired action, such as refusal to process, or printing a highly degraded image. Such graphical elements may be designed so as to have the appearance of being a part of the security document artwork. An example of the use of such elements may be found in U.S. Pat. No. 5,845,008. In other cases, special signals, which are visibly nearly imperceptible, may be added to the printed designs so that they are recognized by special detectors in the aforesaid devices, which may then trigger responses as described above. An example of the use of such elements may be found in U.S. Pat. No. 6,449,377.

These security features, however, suffer from inherent vulnerabilities. Graphical design elements, even when the attempt is made to make them look like part of the artwork, may often be readily recognized for their intended purpose. The result is that they may be altered just slightly enough so that the special detectors no longer identify them and thus fail to interrupt the forger's desired action. They may also be misused by applying said elements to other documents not intended to be protected by the legitimate users so that persons are unable to complete scanning, copying or printing actions on said documents.

Special signals such as digital watermarks can also have the undesirable trait of appearing to distort the printed document. In the case of banknote artwork, this can be especially undesirable. The distortion can be lessened, albeit at the expense of signal strength; usually a compromise is sought.

Artificial Intelligence (AI) in combination with machine learning is increasingly being used for applications like facial recognition and other object identification. In such applications, there are an infinite number of potential images, which may need to be robustly recognized. An application, for example, which is trained to recognize an image of a gray squirrel as such may encounter any one of a huge variation of gray squirrel sizes, poses, ages, color shades, lighting or any other of a number of individual characteristics. An application designed to reliably recognize an individual person's face will have to face similar variations, which at the very least adds to the computational complexity and computing resource needs of the application.

SUMMARY

It is an object of the present invention to overcome or at least to reduce the disadvantages of known methods for copy protection, respective data processing devices, and respective computer program products according to the prior art.

The objective technical problem is solved according to the subject matter of the independent claims. Advantages (preferred embodiments) are set out in the detailed description hereinafter and/or the accompanying figures as well as in the dependent claims.

According to an aspect, a computer-implemented method for preventing unauthorized processing of a digital representation of at least a portion of a document is provided. According to the method, data is provided, wherein the data is based on the digital representation of at least a portion of a test element. The data which is based on the digital representation of the at least one portion of the test element is analyzed with regard to data representing at least one characterizing feature of the at least one portion of the document. Prohibiting means are activated if the data being based on the digital representation of the at least one portion of the test element is similar to the data representing the at least one characterizing feature. Then further processing of the data being based on the digital representation of the at least one portion of the test element is prohibited by the prohibiting means. In an alternative, the data being based on the digital representation of the at least one portion of the test element is amended by the prohibiting means such that the data is prevented from being transmitted and/or printed and/or reproduced and/or further amended by data processing devices.

Within the context of the present method, the document can be a security-related document, in particular one of a banknote, a check, a bill, a ticket, a passport, or a flight ticket. For these document types an unauthorized processing of a respective digital representation of a test element being similar to the document holds significant risks for both, economical and security-related reasons. These risks are avoided or at least reduced by means of the method for preventing unauthorized processing.

Within the context of the present method, the test element refers to an item which potentially can be considered by an objective (unbiased) observer to be a document of one of the above types. In other words, a test element (sample, probe) within the present context can be something which is sufficiently similar to an original document such that an objective observer may erroneously consider the test element to be an original document. For example, a forged banknote may be considered an original banknote. The misbelief of the objective observer may exist even though there are considerable deviations between the test element and the original. In this regard, if the document and the test element are directly compared to each other such deviations may be easily recognizable. However, the remembrance of the objective observer is limited. Therefore, if the objective observer only inspects the test element without having immediate access to an original document, the observer may consider the test element to be an (original) document. The objective observer does not need to be an expert in the field but is considered a person commonly using the original document. The portion of the test element can in particular be a one-dimensional or two-dimensional portion of the test element.

Within the context of the present method, the digital representation refers to a digital code usually written in a computer language and therefore being computer-readable code. As such, the digital representation of a portion of an item (original document, test element, or training document) can be a data file representing a portion of the item. The data file can be suitable to describe the properties of the item by means of the digital code.

Within the context of the present method, the data which is provided does not need to be a complete data file. The data which is provided can also be a fraction of a data file, for example a fraction of an image file, a text file, or a pdf file representing the portion of the test element. Usually the data of the test element will be at least a portion of an image file. Accordingly, the data can also be a string of data when transmitted from a first data processing device to another data processing device.

In particular, the data file of the item (original document, test element or training document) can be an image file, a text file, or a pdf file of the document (test element or training document). The data file can be an image file having a resolution within the range of 50 dpi to 2000 dpi, in particular within the range of 100 dpi to 1000 dpi, further in particular within the range of 200 dpi and 600 dpi, further in particular in the range of 300 dpi to 400 dpi.

Within the context of the present method, the characterizing feature of the document can be a physical property of the document or substances applied thereon based on which an objective observer may consider the test element to be a (original) document. The characterizing feature is further described in detail later.

Within the context of the present method, similarity of the data does not require the data representing the test element and the document to be equal to each other. The data according to the present method basically relate to properties of the respective items of which the data is a digital representation. However, these properties can of course be described by different data, e.g. due to different available data file formats or computer languages. Therefore, the data relating to different items can be considered to be similar to each other, if the data can describe a property of the test element which can be substantially similar to the characterizing feature. For example, the characterizing feature of the document can be two blue lines oriented in parallel to each other. The data of the test element can then also describe two blue lines in parallel to each other. However, the data relating to the test element can be written in a different computer language. In an alternative, a different color code could be used with regard to the test element to describe the color of the lines (e.g. RGB vs. CYMK). Independent of these deviations relating to the underlying code, the feature of the test element can differ from the characterizing feature but still be approved to be similar. In this regard, similarity of the features relates to the assessment of the similarity by an objective observer. The method can also take a pixelation of the digital representation of the at least one portion of the test element into consideration when the similarity to the data of the document is determined. Furthermore, the method can take a resolution and/or color distribution and/or contrast distribution and/or brightness distribution feature according to the of the test element into account. Accordingly, the present method can be configured to interpret the data of the test element and to recognize the property of the item to which the data relate. If that property is similar to the characterizing feature, the respective data can be considered to be similar to each other within the meaning of the present method. It is noted, that the assessment with regard to the similarity of the features is different than an assessment with regard to authenticity. The present method does not authenticate the features of the test element or the test element itself with regard to the document. This is further explained later.

Within the context of the present method, the prohibiting means can be a software or hardware implemented structure. The prohibiting means can be configured to determine whether or not actions on some data are applied. In this regard, the prohibiting means can be configured to issue instructions to bus structures, interfaces, data processing units, storage memories or the like. Accordingly, the prohibiting means can have a master functionality such that the remaining components of the data processing device are slaves compared to the prohibiting means.

Within the context of the present method, further processing of data can comprise copying and/or transmitting and/or printing and/or reproducing the data. Accordingly, all of such actions applied to the data can be prohibited by the prohibiting means. As such, further processing does not only refer to the transmission of a data file but also to any action applied to a portion of such a data file, e.g. the reproduction of a string of the respective data.

Within the context of the present method, amending the data can comprise amending the data to include a mark/an attribute/a flag, wherein the mark/attribute/flag prevents the data to be transmitted and/or printed and/or reproduced and/or further amended by data processing devices. Accordingly, the prohibiting means can be configured to amend the data such that any other data processing device immediately recognizes that processing of the data is prohibited. In an alternative, the prohibiting means can also be configured to delete the data.

Accordingly, a method is provided which advantageously prohibits further processing of data being based on the digital representation of at least a portion of a test element if the data is similar to data representing at least one characterizing feature of a document. In other words, if the test element is similar enough to the document, further processing of its digital representation is advantageously prohibited.

Contrary to the discussed issue of prior art facial recognition and other object identification with the aid of artificial intelligence (AI) an infinite number of potential images to be recognized), for the field of security documents such as banknotes the number of images to be recognized may be expected to be much lower. In particular, it may be expected to be finite, perhaps numbering in the several hundreds, which are desired to be recognized. By basic image is meant e.g. a flat, evenly illuminated image of a given banknote series denomination and face (front or back). There will of course be expected variations such as the individual serial numbers and other identifiers, and small variations in printing quality and registration, as well as in the resolution of the image.

As the purpose of the invention as described herein is to provide a means to recognize a security document image in a form that would be considered to represent the security document (without authentication of a security feature) by an average person, it is not necessary to recognize every possible variation of said document. The reason for this is that if a given security document representation is found by an average person to be too distorted to be acceptable as a security document in case of reproduction, then it is not necessary according to the present invention to prevent reproduction of the digital image. Thus, the training set for this invention, and the corresponding computational resources required for the detection process, may be expected to be significantly smaller than typical training sets and computational resources for AI applications in, e.g., facial recognition proceedings.

A further advantage of this invention is that to the inventive method does not authenticate a security feature of the digital document image, but merely recognize an image as being similar enough to a basic image in the training set to be recognizable as an actual security document image by an average person. Close inspection of e.g. counterfeit banknotes invariably reveals differences from an authentic banknote, but the inventive method does not conduct the close inspection. Nevertheless, there exist differences, which are small enough so that an average person does not recognize the differences and, thus, considers that a reproduced document would represent a security document whereas it relates to a counterfeit, which is not recognized as counterfeit, typically short amount of time that an exchange takes place. By contrast, if AI is used for e.g. human facial recognition, an error in "authenticating" a given face can have serious legal consequences.

As the present invention does not detect special signals of the document image and, thus, no additional features, such as copy codes, have to be added to the security documents, no obvious advantage may come to a person who accesses the detection code for this invention.

Indeed, the fact that there is no need for the use of special signals, copy codes or graphical design elements is in itself a great advantage of this invention. As discussed above, the use of these techniques can visually alter the security document in a way that is aesthetically unpleasing while at the same time creating security vulnerabilities. In the method of this invention, the designers of the security document need not be concerned with the addition of special features that are aesthetically disruptive and/or create vulnerabilities, as the images will be recognized by the detector holistically.

Yet another advantage of the invention is that any security document may be used in the training set, regardless whether or not that security document was first created before or after implementation of the detector. By contrast, when the copy prevention depends on the use of special signals, copy codes or graphical design elements, which only have been created after implementation of the detection, there is no possibility to detect security documents which contain the new codes. Vice versa, in case the detector does not detect old copy codes, documents, which still may be in use cannot be detected and, thus, their copying cannot be prevented using the prior art authentication method for copy prevention.

According to another aspect, data being based on the digital representation of the at least one portion of the test element can be recorded by means of an inspection device. The inspection device can be a visual inspection device and can be based on image recognition or computer vision techniques. The inspection device can in particular be a scanning device (pick-up head) and/or an imaging device and/or a camera. The inspection device can be configured to provide a data file of the item (document, test element or training document) which can be an image file, a text file, or a pdf file of the item. The inspection device can in particular be configured to provide an image file having a resolution within the range of 50 dpi to 2000 dpi, in particular within the range of 100 dpi to 1000 dpi, further in particular within the range of 200 dpi and 600 dpi, further in particular in the range of 300 dpi to 400 dpi. Accordingly, having a test element present, the method can advantageously include the creation of the data being based on the digital representation of the at least one portion of the test element by means of the inspection device. Therefore, the method does not depend on external resources providing the respective data such that the risk of a manipulation of the data representing the portion of the test element is reduced.

According to another aspect, at least a portion of a training document can be provided. The data representing a digital representation of the at least one portion of the training document can be recorded by means of an inspection device. The inspection device can in particular be one of the before mentioned type. The data representing a characterizing feature of the at least one portion of the document can be identified within the data representing the digital representation of the at least one portion of the training document by means of artificial intelligence (AI) and/or machine learning (ML).

Within the context of the present method, artificial intelligence (AI) refers to a software or hardware based technique which is configured to draw decisions, e.g. an algorithm. The AI can also be configured to automatically exploit provided data with regard to the intended purpose and to automatically provide the user with the respective result.

Within the context of the present method, machine learning refers to a software or hardware based technique which can include AI capabilities. The ML can be configured to include multiple inputs to improve the process of drawing decisions. In other words, the ML can be configured to recognize several similar inputs in order to improve the probability of the accuracy of drawing a decision compared to the accuracy drawing a decision based on a single input. E.g. if several similar training documents are provided, the ML can be configured to identify characterizing features which all of these training documents have in common. Furthermore, the ML can also be configured to identify characterizing features within the set of training documents even if the individual training documents of the set are dissimilar, such as banknotes having different values.

Within the context of the present method, a training document can be a document used to identify at least one characterizing feature. Based on the characterizing feature an objective observer can evaluate the similarity of the test element compared to the (original) document. In other words, a training document can be used to train the method (or the related software or hardware based means) such as the AI and/or ML of the set of peculiarities which the test element is to be analyzed about. In this regard, the data representing a digital representation of the at least one portion of the training document is provided to the AI and/or ML. The AI and/or ML can then be configured to identify peculiarities within these data representing characterizing features which determine what the test element is to be analyzed about.

Accordingly, the method advantageously comprises a training process to automatically evaluate which peculiarities included in the training document can serve as proper characterizing features in order to define what the test element is to be analyzed about to assess similarity of the test element and the document. The so designed method does not rely on predetermined inputs for the features which the test element is to be analyzed for.

According to another aspect, the data representing a characterizing feature and determined based on the training document can be stored in a storage memory. In particular, the data can be stored encrypted and/or error coded. Moreover, the data can also be stored in a local (within the same data processing structure) or nonlocal fashion (on a server and/or an external memory). The data can also be stored within the storage memory in order to build up a data base. Accordingly, availability of the data representing the characterizing feature can advantageously be retained such that use of the data may be made at the time of analyzing the test element.

According to another aspect, the inspection device can be configured to record the data representing a digital representation of the at least one portion of the test element or training document substantially independent of at least one out of an angular orientation of the item with regard to the inspection device, the item inspected by the inspection device being cropped and/or mutilated, a resolution provided by the inspection device, a distortion of the item with regard to the inspection device, a scaling effect applied to the item inspected by the inspection device, and a combination thereof. The items inspected by the inspection device can be subject to various actions by their users. Such actions can in general influence the recordation of data. The method utilizing a so designed inspection device is advantageously robust with regard to external influences.

According to another aspect, the inspection device can operate in reflection mode and/or in transmission mode. The inspection device can comprise a detector and a radiation emitting source. The detector can be configured to detect the radiation emitted by the radiation emitting source reflected by or transitioned through the inspected item. The items inspected by means of the inspection device can comprise features which can be only identifiable in one of a reflection and a transmission mode. Accordingly, the method with a so configured inspection device serves all requirements independent of the mode in which a feature can be identified.

According to another aspect, the AI and/or ML can be configured to perform the analysis with regard to similarity of the data being based on the digital representation of the at least one portion of the test element compared to the data representing at least one characterizing feature of the at least one portion of the document. If the AI and/or ML finds that the data being based on the digital representation of the at least one portion of the test element is similar to the data representing the at least one characterizing feature, the AI and/or ML can also be configured to subsequently activate the prohibiting means. The so configured method comprises the same AI and/or ML to be used for determining data representing the characterizing feature. Therefore, advantageously the same AI and/or ML (criteria) are homogenously applied during the entire method such that potential diversities are reduced.

According to another aspect, the data being based on the digital representation of the at least one portion of the test element can be analyzed with regard to the data representing the characterizing feature by means of the AI and/or ML, wherein the data representing the characterizing feature is stored in a storage memory. The storage memory provides the possibility to store the data relating to the characterizing feature for analyses such that the steps can be advantageously performed temporal independent of each other.

According to another aspect, the characterizing feature can be at least one out of a single or a plurality of specific distributions of contrast levels and/or colors and/or marks arranged and/or printed and/or applied on a surface of and/or contained within an item. The characterizing feature can also be at least one out of a single or a plurality of shapes of marks arranged and/or printed on a surface of and/or contained within an item. Moreover, the characterizing feature can be at least one of a single or a plurality of moiré patterns, microstructures, microtext, digital security marking feature invisible to the naked eye, guilloches, rainbows, intaglios, optically variable device, holograms, optical lenses, watermarks, QR codes, and fingerprints. Furthermore, the characterizing feature can be at least one of a single or a plurality of specific materials arranged on a surface of and/or contained within the item, in particular wherein the specific materials comprise at least one of a paper, a polymer, and a textile such as cotton. Also, the characterizing feature can be at least one of a single or a plurality of security features arranged on a surface of and/or contained within the item. The security feature can comprise at least one of a hologram, micro lens, embedded security thread, security foil, transparent or semi-transparent window, labeling, and symbol. In addition, the characterizing feature can be any combination of the aforementioned. The so configured method is advantageously improved with regard to secureness. Since the characterizing feature is not a priori determined it is generally unknown based on which criterion the test element is analyzed. Therefore, the test element cannot be designed according to a predetermined known criterion. Moreover, due to the wide range of possible features each feature can generally be individually evaluated with regard to its suitability of acting as a characterizing feature. Accordingly, the method is also advantageously improved with regard to its reliability.

According to another aspect, a characterizing feature identified within the data representing the training document can be independent of at least one out of an angular orientation of the item with regard to the inspection device, the item inspected by the inspection device being cropped and/or mutilated, a resolution provided by the inspection device, a distortion of the item with regard to the inspection device, a scaling effect applied to the item inspected by the inspection device, and a combination thereof. Accordingly, the characterizing feature can be robust with regard to various external influences which can affect the document (training documents) during their regular use.

According to another aspect, the method can comprise determining a reference value. The reference value can be based on a probability that the data representing the at least one characterizing feature of the at least one portion of the document is similar to the data being based on the digital representation of the at least one portion of the test element. The reference value can be true if the reference value is larger than a pre-determined threshold value. Determining the reference value can be included within the step of analyzing the data being based on the digital representation of the at least one portion of the test element with regard to data representing at least one characterizing feature of the at least one portion of the document. Moreover, activation of the prohibiting means can depend on whether the reference value is true. Based on the respective probability a reference value can be determined indicating whether the data representing the test element is similar to the data representing the characterizing feature. Accordingly, though the so configured method advantageously takes deviations up to a certain degree between the respective data into account, the method can still reliably determine upon the similarity of the respective data.

According to another aspect, the method can comprise the manipulation of the data prior to analyzing whether the data which is based on the digital representation of the at least one portion of the test element is similar to the data representing the at least one characterizing feature of the document. In particular, the data can be transformed and/or filtered to analyze the data with regard to specialized properties, e.g. a 1D or 2D Fourier transform, a logarithmic transform, or a Laplacian filter can be applied to the data. According to the so configured method also special properties of the data can advantageously be analyzed.

According to another aspect, the method can be configured to provide a false-positive rate and/or a false negative rate of 1 over 10 millions or better with regard to the evaluation whether the data being based on the digital representation of the at least one portion of the test element is similar to the data representing the at least one characterizing feature of the document. In general, an event in which an objective observer considers the portion of the test element to be similar to at least a portion of the document is assigned a positive event. To the contrary, an event in which an objective observer considers the portion of the test element to be dissimilar to the document is assigned a negative event. In this regard, similarity of the test element and the document can still be present even if the test element is modified with regard to pixelation effects and/or the respective resolution and/or the color distribution and/or the contrast distribution and/or the brightness distribution described by the data. The false-positive event indicates that similarity of the data is approved although the portion of the element is dissimilar of the document. The false-negative event indicates that the data is approved to be dissimilar to each other although the portion of the element is indeed similar to a portion of the document. The false-positive and false-negative rates indicate the reliability of the method which basically relies on a statistical test. The rate is empirically tested based on a sufficiently large set of data in order to reach the performance desired. The method can also be configured to be more tolerant to false-positives or false-negatives and/or to use a secondary, more thorough determining process on the cases that trigger a positive, yet inconclusive answer. The so configured method advantageously reliably determines the similarity of the data with an acceptable fault tolerance.

According to another aspect, the method can take a pixelation of the data being based on the digital representation of the at least one portion of the test element into consideration when the reference value is determined. Upon determining the reference value the method can further take a resolution and/or color distribution and/or contrast distribution and/or brightness distribution of the data being based on the digital representation of the at least one portion of the test element into account. The so configured method provides an improved accuracy of the reference value since various effects are considered.

According to another aspect, the method can be configured to be executable locally within a first data processing device. The first data processing device can comprise a storage memory in which the respective code of the method can be stored. In an alternative, the method can also be configured to be remotely executable. According to the alternative, the first data processing device can be connected via a data connection with a second data processing device. The method can then be configured to be executable on the second data processing device via the data connection. The so configured method is executable almost independent of the data processing structure. It can advantageously also be executed based on a server-client system, or in a local fashion, e.g. if no network connection is available.

According to another aspect, the method can be based on a code, wherein the respective code of the method can have a binary size between 100 kB and 50 MB, in particular between 200 kB and 10 MB, further in particular between 500 kB and 1 MB. Since the code has a comparable small size the code can advantageously be implemented also in non-high end data processing devices such as a scanning device, a printer, a copying device etc.

According to another aspect, the data being based on the digital representation of the at least one portion of the test element can be provided based on a transmission of the data from a first data processing device to a second data processing device. In other words, the method can be configured to act on data which is transmitted between data processing devices. Further transmission can be prohibited if the data is similar to data representing at least one characterizing feature of the at least one portion of the document. The digital representation of the at least one portion of the element can represent a one-dimensional or two-dimensional portion of the test element. E.g., a line-wise scan of an element may be transmitted from a scanning device to a data processing unit. The method can advantageously be configured to recognize this data and to analyze the data with regard to the data representing at least one characterizing feature of the at least one portion of the document.

According to another aspect, the method can be configured to be executable within a period of time less than 60 sec, in particular within a period of time between 100 msec and 30 sec, in particular within a period of time between a time period less than 1 sec. The so configured method can advantageously be applied also during regular data processing procedures in real-time, such as a print or a scan of an element with acceptable expenditure of time.

According to another aspect, the method can be configured to avoid an authentication of the data representing the at least one portion of the digital representation of the test element with regard to the digital representation of the at least one portion of the document. The aim of the method can be to determine similarities between these data. The method is not intended to authenticate the element with regard to the document. The authentication process is a highly important process which is preserved to authorized facilities for security reasons. Since the method is generally configured to be implemented in common hardware or software available also to a regular customer (copying device and/or printer and/or scanning device), the method advantageously does not comprise authentication-capabilities such that the details of the authentication process are kept secret.

According to another aspect, a device for data processing is provided. The device can comprise means for conducting the above-mentioned method. Moreover, the device can also comprise means such that the modifications of the method described above can be conducted. In particular, the device for data processing can comprise a data processing unit such as a CPU. The data processing unit can be configured to analyze and/or to process and/or to amend the data. The data processing device can further comprise at least one of a storage memory to store the data, an interface to communicate with other data structures, and a data bus to transmit the data between the different components. Moreover, the data processing device can be a component of a scanning device (pick-up head), a printer, or a copying device. Accordingly, a simple and effective data processing device is provided which is advantageously configured to conduct the indicated method.

According to another aspect, the device for data processing can comprise a lower ARM-type multicore CPU or similar CPU commonly used in mobile devices. The device can further comprise a main memory within the range of 4 MB to 8 GB, further in particular within the range of 16 MB to 2 GB, further in particular within the range of 64 MB to 512 MB, further in particular within the range of 128 MB to 256 MB. The method can be configured to be executable on the indicated CPU types in a local or remote fashion using a main memory of the indicated size.

According to another aspect, a computer program product is provided. The computer program product can comprise instructions which, when executed by a data processing device, cause the device to carry out the above-mentioned method. The instructions can be the result of a code of the computer program product. The computer program product can be written in a computer language suitable to be implemented in a scanning device (pick-up head), a printer, or a copying device. The computer-program product can also be configured to be stored on a volatile or non-volatile storage memory, a hard disk drive, or a computer readable medium such as a USB storage memory, a CD or the like. The computer program product can be configured to be executable from an external or internal memory of a data processing unit. Accordingly, a computer program product is provided which is advantageously configured to conduct the indicated method in various configurations such as from external or internal storage memories.

According to another aspect, the code of the computer program product can be configured to be stored encrypted and/or error-coded. Several of the underlying techniques and instructions should be kept secret for security reasons. Accordingly, if the code is stored encrypted the underlying techniques and instructions can advantageously be prevented from being made public.

BRIEF DESCRIPTION OF DRAWINGS

Further aspects and characteristics of the invention will ensue from the following description of preferred embodiments of the invention with reference to the accompanying drawings, wherein.

DETAILED DESCRIPTION OF EMBODIMENTS

Figure 1:
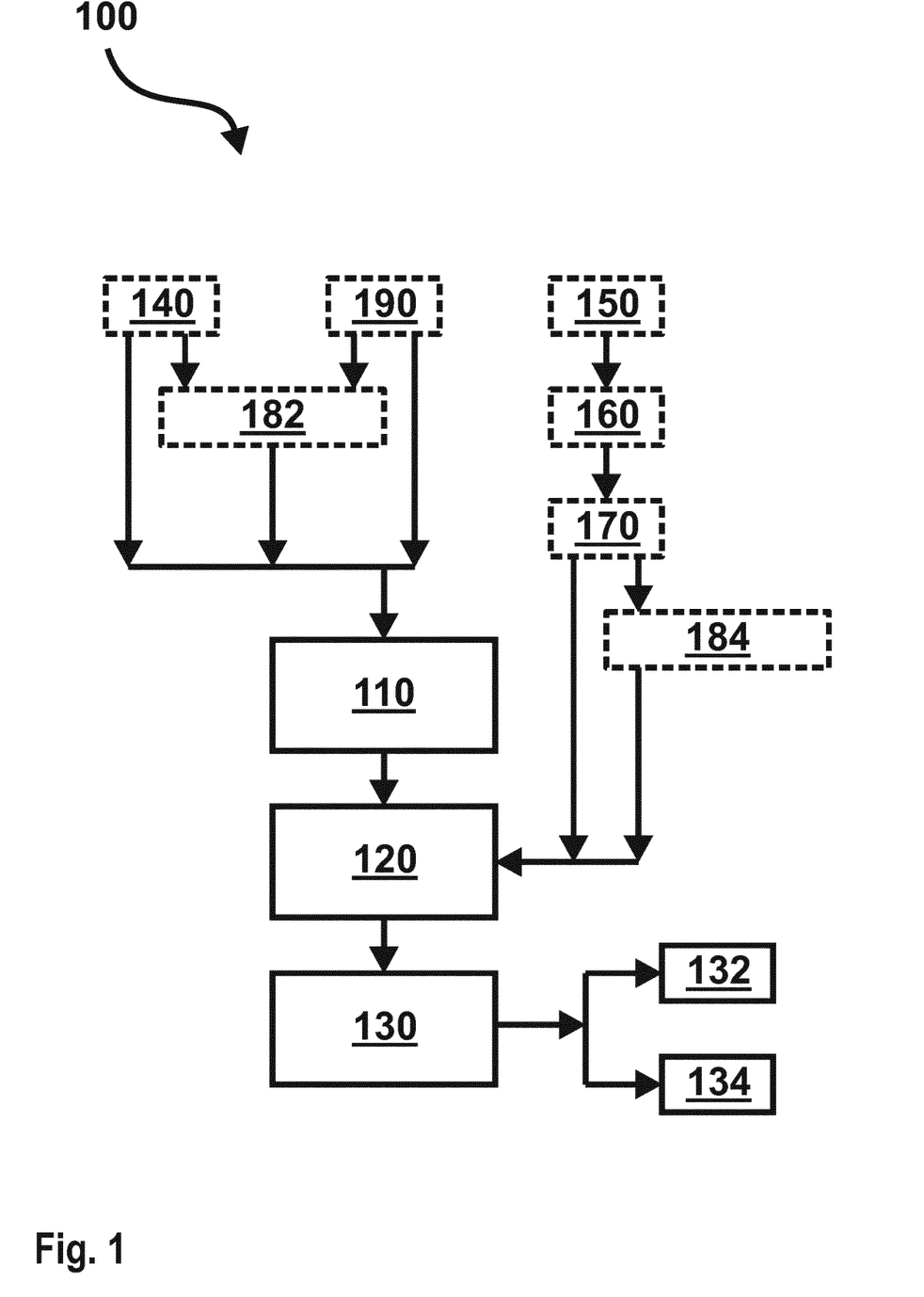
FIG. 1 is simplified schematic flow chart of the method.

FIG. 1 is a simplified schematic flow chart according to the method 100 for preventing unauthorized processing of a digital representation of at least a portion of a document. The method 100 comprises several steps indicated by boxes. Boxes having dashed lines indicate steps which are optional, on a single basis or in any combination. Accordingly, the method comprises at least the steps 110, 120, 130. With regard to steps 132, 134 only one of both needs to be present. Steps 132 and 134 are alternatives to each other.

In step 110 data is provided, wherein the data is based on the digital representation of at least a portion of a test element. In this regard, providing the data can rely on further optional steps 140, 190, and 182. In step 140 the test element (or the portion thereof) is arranged such that data representing the properties of the test element can be recorded. To this end, an inspection device can be used. The inspection device can be a visual inspection device and can be based on image recognition or computer vision techniques such as a scanning unit or a camera. The inspection device can be configured to generate data describing the test element. For example, the generated data can contain e.g. information with regard to distributions of contrast levels and/or colors and/or marks arranged and/or printed on a surface of and/or contained within the test element. In particular, the recorded data can be an image file representing the test element. Accordingly, the data can be a portion of an image file created by the inspection device. In this regard, an image file is the usual approach to describe the (graphical) properties of an item. The inspection device can also be configured to directly provide the recorded data. Accordingly, step 140 can provide the data directly to step 110. In an alternative, the data is provided in accordance with step 190. In step 190 the data is transmitted from a first data processing device to a second data processing device, e.g. as a string. The first data processing device can e.g. be a usual CPU and the second data processing device can e.g. be implemented in a network printer. The CPU and the network printer can be connected by a data bus, e.g. a network connection. The method can be configured such that in step 190 the data which is transmitted is recognized by suitable means of the method. The method can be configured such that the data is intercepted and/or a copy thereof is made and provided. Accordingly, the data can be provided directly to step 110 from steps 140 and 190. In an alternative, the data can be stored in a storage memory in step 182 prior to providing it to step 110. The storage memory can be an external or internal memory. The storage memory can also be a main memory, a hard disk drive or a computer readable medium, such as a USB storage memory, a CD or the like. Storing the data in step 182 in a storage memory provides time independency of the method.

In step 120 the data being based on the digital representation of the at least one portion of the test element is analyzed with regard to data representing at least one characterizing feature of the at least one portion of the document. The characterizing feature of the document can be a graphical or structural peculiarity of the document, such as a specialized bar code. Accordingly, the method can be configured to interpret the data and to analyze whether the data represent features being similar to the characterizing feature of the document. Usually the data of the test element will be at least a portion of an image file. If this image file contains a feature which is similar to the exemplary specialized bar code the method determines the respective data to be similar to each other.

The data representing the characterizing feature may also be provided to the method. In this regard, in step 150 a training document can be provided. In step 160 the training document can be inspected such that data representing the properties of the training document can be recorded. Recording of the data can be performed by an inspection device, in particular a visual inspection device as has been described before with regard to the test element. In particular, the recorded data can be an image file representing the training document. In step 170 at least one characterizing feature can be identified within the data recorded with regard to the training document. To this end, artificial intelligence (AI)

and/or machine learning (ML) techniques can be applied. Accordingly, the data (usually an image file) can be inspected by the AI and/or the ML for peculiarities which represent suitable criteria for assessing similarity with the test element. The characterizing feature chosen in step 170 is a feature, which, when realized in the test element in a similar fashion, can cause an objective observer to consider the test element and the training document to be similar to each other. In an alternative, steps 150 and 160 are repeated several times meaning that several training documents are provided. Accordingly, the at least one characterizing feature identified in step 170 by the AI and/or ML can also rely on a set of data recorded with regard to multiple training documents. When a characterizing feature is identified, the data representing that feature can be provided to step 120 for the assessment with regard to similarity of the data. In an alternative, the data representing the characterizing feature can be stored in an external or internal storage memory in step 184. Accordingly, the method can be executed timely independent of the steps 150, 160, and 170. Moreover, in step 184 a data base can be built up in order to have a variety of possible characterizing features. This is of special interest if the method is implemented in a server-client based structure.

The assessment of the similarity of the data representing the test element and the characterizing feature of the document is performed in step 120. In step 130 prohibiting means are activated if the data being based on the digital representation of the at least one portion of the test element is similar to the data representing the at least one characterizing feature. Step 130 therefore describes the technical effect of the method if the respective data are considered by the method to be similar to each other. The prohibiting means can be configured to provoke at least one technical effect described with regard to steps 132 and 134. According to step 132 the data relating to the test element is prohibited by the prohibiting means from being further processed. The prohibiting means can comprise a master functionality. The prohibiting means can then issue instructions such that the respective data is prohibited from being further processed. In an alternative, according to step 134, the data is amended by the prohibiting means such that the data is prevented from being transmitted and/or printed and/or reproduced and/or further amended by other data processing devices. In this regard, the data can be assigned a special flag and/or attribute and/or mark which indicates that the data is prohibited from being further processed.

In an alternative, the method can be configured such that the steps 120 and 130 can also be carried out by the AI and/or ML. Accordingly, the AI and/or ML can also be applied to determine the similarity of the data of the test element and the characterizing feature.

Figure 2:
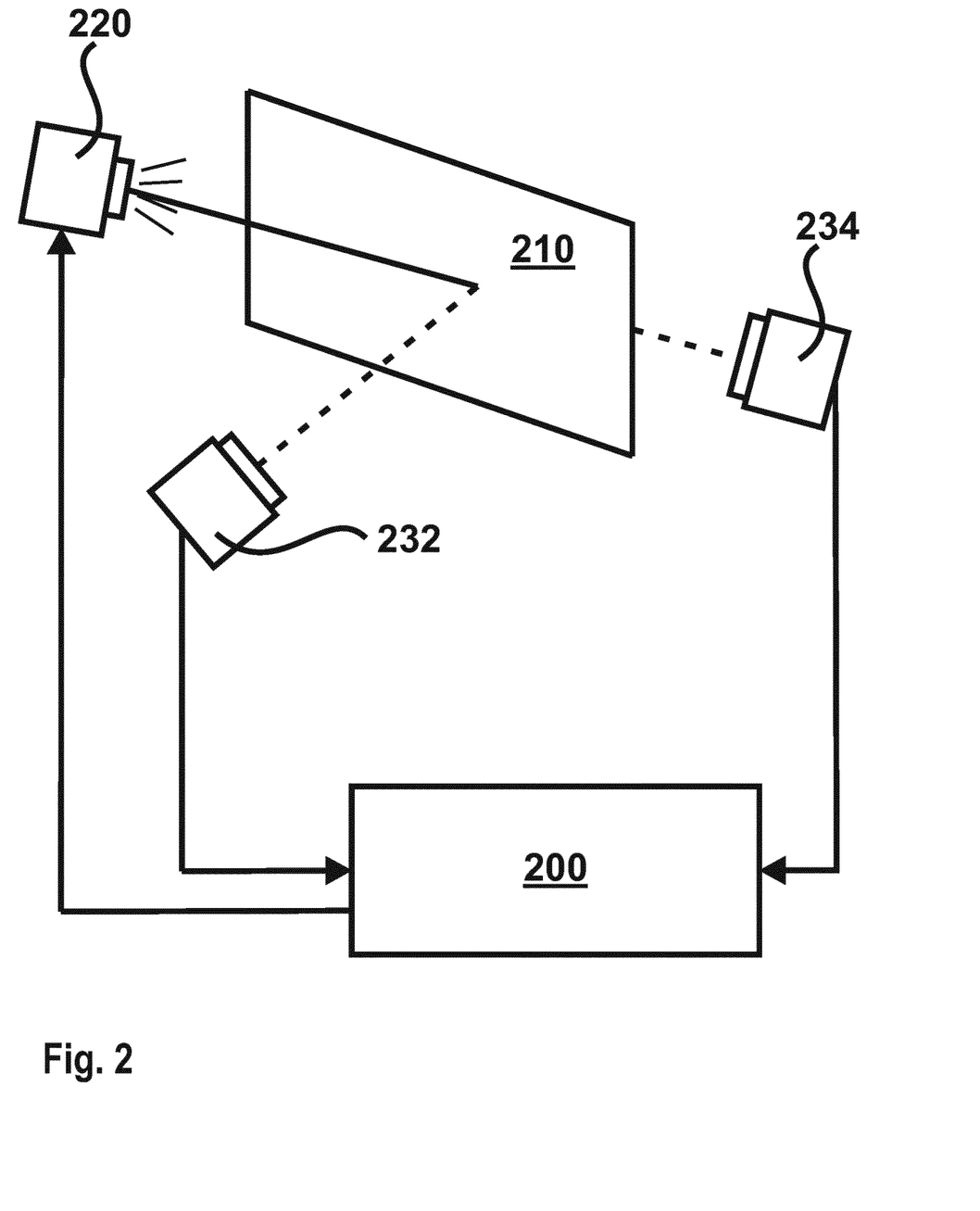
FIG. 2 is a simplified schematic drawing of a data processing device utilizing an inspection device for recording of data.

FIG. 2 is a simplified schematic drawing of a data processing device 200 utilizing an inspection device for recording of data. The data processing device 200 can be configured such that it can execute the method 100. Moreover, the data processing device 200 is connected to an external inspection device mentioned before with regard to steps 140 and 160. The inspection device according to the present embodiment comprises a radiation emitting source 220 and a detector 232, 234. Here, the radiation emitting source 220 and the detector 232, 234 are external components connected to the data processing device 200. Alternatively, the radiation emitting source 220 and the detector 232, 234 can also be internal components of the data processing device 200. The radiation emitting source 220 and the detector 232, 234 can be combined with the data processing device 200 in a scanning device, a printer, or a copying device.

An item 210 (document, test element, or training document) is arranged such that radiation can be emitted by the radiation emitting source 220 toward the item 210. The radiation emitted by the radiation emitting source 220 can have any wavelength suitable to investigate the item 210. In particular the radiation can have a wavelength corresponding to UV light and/or visible light and/or IR radiation. The operation of the radiation emitting source 220 can rely of respective instructions issued by the data processing device 200. The inspection device can then be configured such that the detector 232 can detect the radiation reflected by the item 232 wherein the reflection of the radiation depends on the physical properties of the item 210. Accordingly, information about the physical properties of the item 210 is gained such that a digital representation of the item 210 can be generated. The digital representation can be generated by the detector 232 and communicated with the data processing device 200. In an alternative, the data processing device 200 generates the digital representation of the item 210 based on information received from the detector 232. Moreover, the inspection device can also be configured such that a detector 234 detects the radiation transitioned through the item 210. Depending on whether the radiation is detected in reflection or transmission mode, different physical properties of the item can be evaluated.

Figure 3:
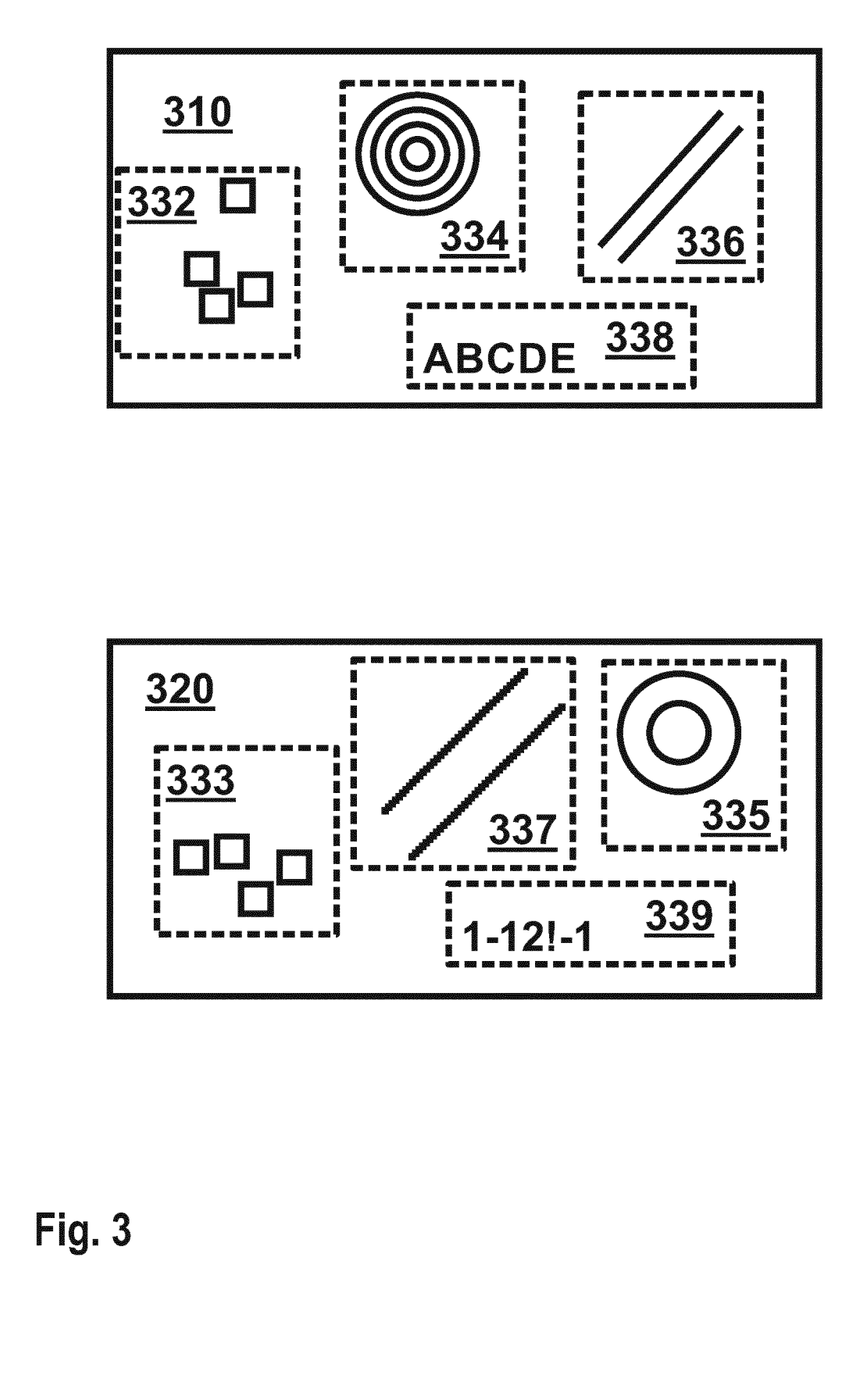
FIG. 3 is a simplified schematic drawing of a training document and a test element.

FIG. 3 is a simplified schematic drawing of a training document 310 and a test element 320. The training document 310 can be substantially similar to a document which digital representation is to be prohibited from unauthorized processing. The training document 310 comprises various features 332, 334, 336, 338 each surrounded by boxes of dashed lines. These features can e.g. be a distribution of marks, such as the first feature 332. The second feature 334 comprises several concentric circles. Therefore, the second feature 334 is particularly invariant with regard to a linewise inspection of the training document 310 as long as the line-wise inspection coincides with the center of the concentric circles. The third feature 336 comprises two individual lines oriented in parallel to each other. The fourth feature 338 comprises a letter-based code printed on the training document 310. The letter-based code can be a serial number of the training document 310. The features can vary with regard to several properties such as their position within the training document 310, color, contour, etc. Of course, further features such as those described with regard to the characterizing feature within the context of the present method can be part of the training document 310. The features contained with the training document 310 can all serve as characterizing features in order to assess similarity of a document with a test element 320. A different training document 310 can have several of the indicated features in common with the training document 310 depicted in FIG. 3. However, the training documents can also be different of each other with regard to several features.

There is also a test element 320. The test element 320 comprises several features 333, 335, 337, 339. These features deviate with regard to the feature of the training document 310 with regard to several properties, such as their position, distribution, data format, number, shape, etc. If the training document 310 and the test element 320 are directly compared to each other, the deviations between these items can be appropriately identified. However, if the test element 320 is inspected independent of the training document 320 a person may consider the test element 320 to be an (original) document. This misbelief can be caused due to the limited remembrance of the exact properties of the features of the training document 310 or an (original) document if the document is not currently present. Accordingly, an objective observer can approve that the test element 320 is similar to the training document 310 though there can be considerable differences between these items if they are compared in detail. Consequently, an objective observer can identify data being based on a digital representation of features 333, 335, 337, 339 of the test element 320 to be similar to data representing the characterizing features 332, 334, 336, 338 of the training document 310. Accordingly, processing of the data representing the test element 320 would be prohibited, or, alternatively, the data would be amended by the prohibiting means such that the data is prevented from being further processed.

Although the invention has been described hereinabove with reference to specific embodiments, it is not limited to these embodiments and no doubt further alternatives will occur to the skilled person that lie within the scope of the invention as claimed.

Embodiments of the Present Invention

Embodiment 1. Computer-implemented method for preventing unauthorized processing of a digital representation of at least a portion of a document, in particular a portion of a banknote, comprising the steps of:
a) providing data, wherein the data is based on the digital representation of at least a portion of a test element, in particular wherein the digital representation of the at least one portion of the test element is an image file corresponding to the at least one portion of the test element,
b) analyzing the data being based on the digital representation of the at least one portion of the test element with regard to data representing at least one characterizing feature of the at least one portion of the document,
c) activating prohibiting means if the data being based on the digital representation of the at least one portion of the test element is similar to the data representing the at least one characterizing feature, wherein
further processing of the data being based on the digital representation of the at least one portion of the test element is prohibited by the prohibiting means, and/or wherein
the data being based on the digital representation of the at least one portion of the test element is amended by the prohibiting means such that the data is prevented from being further processed.

Embodiment 2. The computer-implemented method according to embodiment 1, wherein the method further comprises the step of:
d) recording the data being based on the digital representation of the at least one portion of the test element by means of an inspection device, in particular by means of a visual inspection device such as a scanning device and/or a camera, in particular wherein the inspection device is configured to provide a data file of the at least one portion of the test element having a resolution within the range of 50 dpi to 2000 dpi, in particular within the range of 100 dpi to 1000 dpi, further in particular within the range of 200 dpi and 600 dpi, further in particular in the range of 300 dpi to 400 dpi.

Embodiment 3. The computer-implemented method according to any of the preceding embodiments, wherein the method further comprises the steps of:
e) providing at least a portion of a training document,
f) recording data representing a digital representation of the at least one portion of the training document by means of an inspection device, in particular a visual inspection device such as a scanning device and/or a camera, in particular wherein the inspection device is configured to provide a data file of the at least one portion of the training document having a resolution within the range of 50 dpi to 2000 dpi, in particular within the range of 100 dpi to 1000 dpi, further in particular within the range of 200 dpi and 600 dpi, further in particular in the range of 300 dpi to 400 dpi, and
g) identifying data representing a characterizing feature within the data representing the digital representation of the at least one portion of the training document by means of artificial intelligence and/or machine learning.

Embodiment 4. The computer-implemented method according to embodiment 3, wherein the method further comprises the steps of:
h) storing the data identified in step g) in a storage memory, in particular wherein the data is stored encrypted and/or error coded.

Embodiment 5. The computer-implemented method according to any one of the embodiments 2 to 4, wherein the inspection device is configured to record the data in step d) and/or f) substantially independent of at least one out of:
an angular orientation of the item with regard to the inspection device,
the item inspected by the inspection device being cropped and/or mutilated,
a resolution provided by the inspection device,
a distortion of the item with regard to the inspection device, and
a scaling effect applied to the item inspected by the inspection device.

Embodiment 6. The computer-implemented method according to any one of the embodiments 2 to 5, wherein the inspection device operates in reflection mode and/or in transition mode, in particular wherein the inspection device comprises a detector and a radiation emitting source.

Embodiment 7. The computer-implemented method according to embodiments 3 to 6, wherein the steps b) and c) are conducted by means of the artificial intelligence and/or machine learning, in particular wherein the artificial intelligence and/or machine learning determines in step c) whether the data being based on the digital representation of the at least one portion of the test element is similar to the data representing the at least one characterizing feature of the at least one portion of the document.

Embodiment 8. The computer-implemented method according to any of the preceding embodiments, wherein the characterizing feature is at least one out of:
a single or a plurality of specific distributions of contrast levels and/or colors and/or marks arranged and/or printed on a surface of and/or contained within an item,
a single or a plurality of shapes of marks arranged and/or printed on a surface of and/or contained within an item,
a single or a plurality of moiré patterns, microstructures, microtext, Cryptoglyph, guilloches, rainbows, intaglios, optical devise, holograms, kinegrams, optical lenses, watermarks, QR codes, and fingerprints, a single or a plurality of specific materials arranged on a surface of and/or contained within the item, in particular wherein the specific materials comprise at least one of a paper, a polymer, and a textile such as cotton, a single or a plurality of security features arranged on a surface of and/or contained within the item, in particular wherein the security feature comprises at least one of a hologram, micro lens, embedded security thread, window, labeling, and symbol, and a combination thereof.

Embodiment 9. The computer-implemented method according to any of the preceding embodiments, wherein step b) comprises determining a reference value, wherein the reference value is based on a probability that the data representing the at least one characterizing feature of the at least one portion of the document is similar to the data being based on the digital representation of the at least one portion of the test element, wherein the reference value is true if the reference value is larger than a pre-determined threshold value, and wherein step c) comprises activating the prohibiting means if the reference value is true.

Embodiment 10. The computer-implemented method according to embodiment 9, wherein determining the reference value takes a pixelation of the data being based on the digital representation of the at least one portion of the test element into consideration, in particular wherein determining the reference value also takes a resolution and/or color distribution and/or contrast distribution and/or brightness distribution of the data being based on the digital representation of the at least one portion of the test element into consideration.

Embodiment 11. The computer-implemented method according to any one of the preceding embodiments, wherein the method is configured to be executed locally within a first data processing device comprising a storage memory in which the respective code of the method is stored, or remotely, wherein a first data processing device comprises a storage memory in which the respective code of the method is stored, wherein the first data processing device is connected via a data connection with a second data processing device, and wherein the method is executed on the second data processing device via the data connection; and/or wherein the data being based on the digital representation of the at least one portion of the test element in step a) is provided based on a transmission of the data from a first data processing device to a second data processing device, in particular wherein the digital representation of the at least one portion represents a one-dimensional or two-dimensional portion of the test element; and/or wherein the method is executed within a period of time less than 60 sec, in particular within a period of time between 100 msec and 30 sec, in particular within a period of time between a time period less than 1 sec.

Embodiment 12. The computer-implemented method according to any one of the preceding embodiments, wherein the method does not authenticate the data representing the at least one portion of the digital representation of the test element with regard to the digital representation of the at least one portion of the document.

Embodiment 13. Device for data processing comprising means for conducting the method according to any one of the embodiments 1 to 12.

Embodiment 14. Computer program product comprising instructions, which, when the computer program product is executed by a device for data processing, cause the device for data processing to carry out the method according to any one of the embodiments 1 to 12.

Embodiment 15. Computer program product according to embodiment 14, wherein the code of the computer program product is stored encrypted and/or error-coded.

The invention claimed is:

1. Computer-implemented method for preventing unauthorized processing of a digital representation of at least a portion of a test element, the test element deviating from an original security document as well as from a training document but being considered as an original security document, the method, comprising:

a) providing at least a portion of a training document, b) recording an image file of the training document representing a digital representation of the at least one portion of the training document using an inspection device, wherein the inspection device provides a data file of the at least one portion of the training document having a resolution within a range of 50 dpi to 2000 dpi, c) identifying data representing a characterizing feature within the image file of the training document using artificial intelligence, wherein the image file is inspected by the artificial intelligence for identifying a set of peculiarities which represent criteria for assessing similarity with a test element, wherein the set of peculiarities of the characterizing feature is a feature when realized in the test element, can cause the test element to be considered as an original security document, wherein the feature which the test element is to be analyzed for does not rely on predetermined inputs, d) providing an image file of the test element, wherein the image file is based on the digital representation of at least a portion of the test element, wherein the test element deviates from the original security document and the training document, e) analyzing the image file of the test element using the artificial intelligence with regard to the set of peculiarities in the image file of the training document representing the characterizing feature of the at least one portion of the training document, which, when realized in the test element, can cause the test element to be considered an original security document, and determining the similarity of the image file of the test element and the characterizing feature, f) activating a prohibiting software or hardware implemented structure using the artificial intelligence if the image file of the test element is assessed similar to the image file representing the characterizing feature, wherein further processing of the image file of the test element is prohibited by the prohibiting software or hardware implemented structure, and/or wherein the image file of the test element is amended by the prohibiting software or hardware implemented structure such that the image file of the test element is prevented from being further processed, and wherein the method does not authenticate the image file of the test element with regard to the digital representation of the image file of the training document including the at least one portion of the training document.

2. The computer-implemented method according to claim 1, wherein the method further comprises:
g) recording the image file of the test element using an inspection device, wherein the inspection device provides a data file of the at least one portion of the test element having a resolution within the range of 50 dpi to 2000 dpi.

3. The computer-implemented method according to claim 2, wherein the inspection device records the image file of the training document in step b) and/or g) substantially independent of at least one out of:
an angular orientation of an item with regard to the inspection device,
the item inspected by the inspection device being cropped and/or mutilated,
a resolution provided by the inspection device,
a distortion of the item with regard to the inspection device, and
a scaling effect applied to the item inspected by the inspection device.

4. The computer-implemented method according to claim 2, wherein the inspection device operates in reflection mode and/or in transmission mode, and/or wherein the inspection device comprises a detector and a radiation emitting source.

5. The computer-implemented method according to claim 1, wherein step c) is conducted by the artificial intelligence comprising machine learning.

6. The computer-implemented method according to claim 5, wherein the method further comprises:
h) storing the image file of the training document identified in step c) in a storage memory, and/or wherein the image file of the training document is stored encrypted and/or error coded.

7. The computer-implemented method according to claim 5, wherein the steps e) and f) are conducted using artificial intelligence comprising machine learning.

8. The computer-implemented method according to claim 1, wherein the characterizing feature is at least one out of:
at least a single specific distribution of contrast levels and/or colors and/or marks arranged and/or printed on a surface of and/or contained within an item,
at least a single shape of marks arranged and/or printed on a surface of and/or contained within an item,
at least a single moiré pattern, microstructure, microtext, digital security marking feature invisible to a naked eye, guilloche, rainbow, intaglio, optically variable device, hologram, optical lens, watermark, QR code, and fingerprint,
at least a single specific material arranged on a surface of and/or contained within the item, wherein the specific material comprises at least one of a paper, a polymer, and a textile such as cotton,
at least a single security feature arranged on a surface of and/or contained within the item, wherein the security feature comprises at least one of a hologram, micro lens, embedded security thread, window, labeling, and symbol, and
a combination thereof.

9. The computer-implemented method according to claim 1, wherein step e) comprises determining a reference value, wherein the reference value is based on a probability that the image file of the training document is similar to the image file of the test element, wherein the reference value is true if the reference value is larger than a pre-determined threshold value, and wherein step f) comprises activating the prohibiting software or hardware implemented structure if the reference value is true.

10. The computer-implemented method according to claim 9, wherein determining the reference value takes a pixelation of the image file of the test element into consideration, and/or wherein determining the reference value also takes a resolution and/or color distribution and/or contrast distribution and/or brightness distribution of the image file of the test element into consideration.

11. The computer-implemented method according to claim 1, wherein the method is executed locally within a first data processing device comprising a storage memory in which the respective code of the method is stored, or remotely, wherein a first data processing device comprises a storage memory in which a respective code of the method is stored, wherein the first data processing device is connected via a data connection with a second data processing device, and wherein the method is executed on the second data processing device via the data connection.

12. The computer-implemented method according to claim 1, wherein the image file of the test element in step d) is provided based on a transmission of the image file of the test element from a first data processing device to a second data processing device, and/or wherein the digital representation of the at least one portion represents a one-dimensional or two-dimensional portion of the test element.

13. The computer-implemented method according to claim 1, wherein the method is executed within a period of time less than 60 sec.

14. A device for data processing comprising a data processing unit for conducting the method according to claim 1.

15. A non-transitory computer readable medium comprising a computer program product comprising instructions, which, when the computer program product is executed by a device for data processing, cause the device for data processing to carry out the method according to claim 1.

16. The non-transitory computer readable medium according to claim 15, wherein a code of the computer program product is stored encrypted and/or error-coded.

17. The Computer-implemented method of claim 1, wherein the original security document is a banknote.

18. The Computer-implemented method of claim 1, wherein the inspection device is a scanning device and/or a camera.

* * * * *